June 7, 1966 P. A. RIX 3,254,435
ANTI-GLARE SHIELD FOR VEHICLES
Filed Feb. 19, 1965
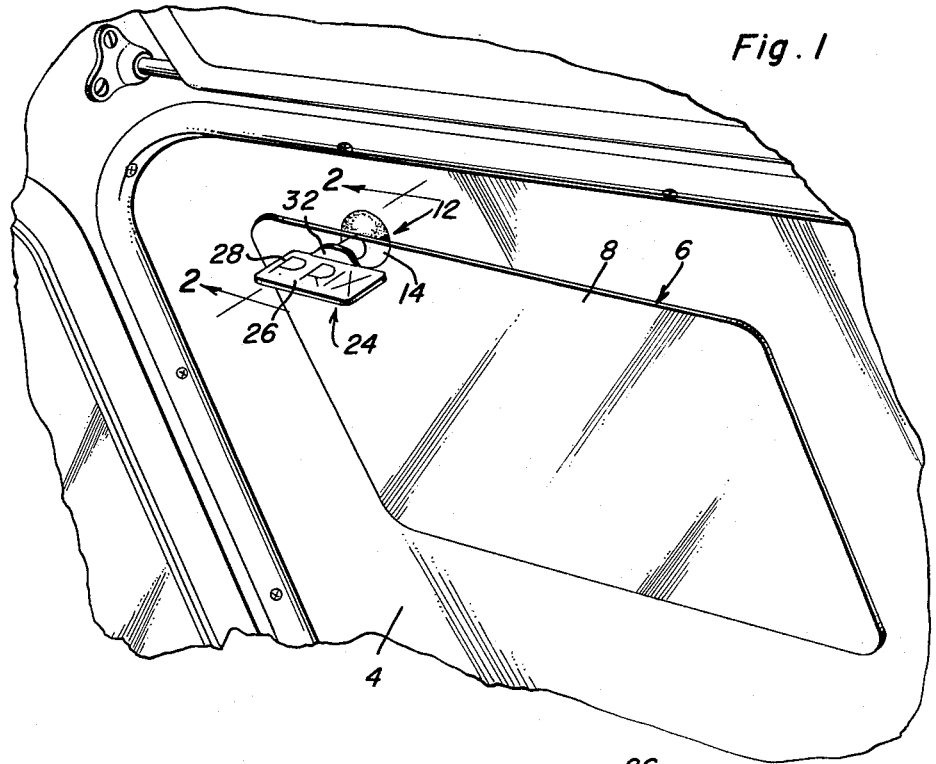
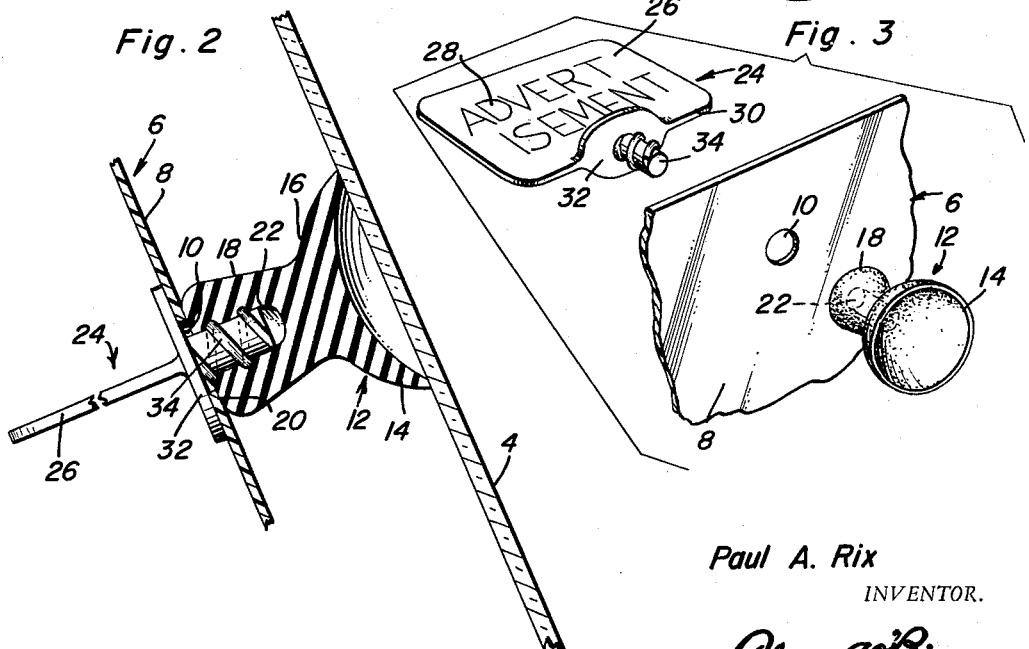
Paul A. Rix
INVENTOR.

United States Patent Office 3,254,435
Patented June 7, 1966

3,254,435
ANTI-GLARE SHIELD FOR VEHICLES
Paul A. Rix, 1700 N. Jackson, Odessa, Tex.
Filed Feb. 19, 1965, Ser. No. 434,029
1 Claim. (Cl. 40—129)

The present invention relates to certain new and useful improvements in an anti-glare shield for use on and in conjunction with a windshield such as is commonly used on vehicles such as, for example, automobiles, motor boats, airplanes and the like.

An object of the present invention is to structurally, functionally and in other ways improve upon prior art shields such as are customarily and satisfactorily used to intercept blinding sun rays, headlight beams from oncoming automobiles, trucks and analogous vehicles and, in so doing, to effectually solve the problem and to provide users with a simplified and practical adaptation which can be justly endorsed for production by manufacturers and effectively employed by users.

Briefly, the invention is characterized by three component parts; namely, a flat faced light intercepting plate or panel which constitutes the shield proper, an adapter which comprises a suction cup for attachment to the windshield and a shank for mounting thereon of the anti-glare shield, and an attaching and retaining device which is unique in that it provides a desired shield attaching stud, but in addition embodies a limit stop or abutment and a plate-like head which constitutes not only a finger grip but a satisfactory surface for advertising media or equivalent indicia.

In carrying out a preferred embodiment of the invention the anti-glare shield comprises a simple practical and economical colored plastic or equivalent panel which is flat faced and usually about 5 inches by 8 inches. This panel provides the desired light intercepting and glare reducing shield, said panel being provided at one upper corner portion thereof with a simple hole for pivoting and mounting purposes.

The invention also features a specially constructed suction cup which embodies the cup proper and a shank, the shank having an axial screw threaded socket which in practice is adapted to be aligned with the hole in the anti-glare shield or panel.

The third improvement has to do with the novel unit or device for clampingly mounting the apertured shield on the socketed shank of the suction cup unit. This means is novel in that it comprises a generally rectangular or equivalent plate which carries the ad and which is provided on a median part of one marginal edge with a limit stop or abutment which is adapted to abut the apertured portion of the shield and which has an axial screw threaded stud to pass through the hole in the shield and into the socket in the aforementioned shank.

This invention, as will be hereinafter more fully clarified, is designed to aid and assist the operator of a motor vehicle to operate the vehicle with safety in that the sunlight when driving early in the morning or late in the afternoon coming through a glass or plastic windshield or window gives the operator a considerable amount of difficulty by causing him to squint his eyes or a passenger in said motor vehicle to employ a piece of paper or other substance to prevent the sun's rays from causing the passenger or operator discomfort. In addition, the glare reducing shield will allow the operator to see more clearly and it is hoped that its adoption and practical use will help decrease the number of accidents during the most difficult driving hours.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing a fragmentary portion of an automobile windshield, the anti-glare shield, and how it is constructed, mounted and functions;

FIGURE 2 is an enlarged view with parts in section and elevation taken approximately on the plane of the line 2—2 of FIGURE 1; and FIGURE 3 is an exploded perspective view.

Referring now to FIGS. 1 and 2 the numeral 4 designates a windshield which may be that on an automobile, airplane, motor boat or the like.

The invention comprises a three part attachment. The first part comprises the aforementioned suitably colored plastic or equivalent anti-glare panel or shield 6 comprising a substantially flat faced rectangular plastic panel 8 which may vary in dimension but is generally some 5 inches by 8 inches in size. This piece or panel of colored plastic acts as a shield to diminish the rays of the sun from passing dangerously therethrough and into the driver's eyes and likewise functions to intercept objectionable glare from headlights of an oncoming automobile, truck or the like. This panel or shield is provided in the upper lefthand corner with a hole 10 of a predetermined size.

The attaching or adapter bracket 12 comprises a simple rubber or equivalent suction cup 14 which can be applied to the windshield 4. The crest or crown portion of the suction cup is provided at 16 with an outstanding sturdy shank 18 of requisite cross section and shape. One end portion of the shank is joined to the crown of the suction cup and the other end portion is generally flat and circular as at 20 to bear against the anti-glare shield as shown in FIGURE 2 in particular. This shank is provided axially with a suitable screw threaded socket 22 which in practice is lined up with the hole 10.

The third component part or unit comprises the handling, mounting and retaining means which is denoted generally by the numeral 24 and which comprises a flat faced rectangular or equivalent plate 26 of appropriate relative size which provides not only a fingergrip or handle but also provides the desired surface area for reception of suitable advertising media or indicia denoted generally at 28 in FIGURE 3. One marginal edge portion 30 is provided with a generally circular collarlike abutment or limit stop 32 which is at right angle to the plane of the plate and is flattened to contact a coacting surface of the glare panel as shown in FIGURE 2. This limit stop or shoulder 32 is provided at its center with an integral axial screw threaded stud 34 which is of a length and cross section that it passes through the hole 10 in the anti-glare shield 6 and screws into the screw threaded socket 22 as perhaps best shown in FIGURE 2.

It is believed that a careful consideration of the specification in conjunction with the views of the drawing will enable the reader to obtain a clear and comprehensive understanding of the construction and cooperation of the individual several parts 6, 12 and 24, the manner in which they are constructed and cooperatively serve the purposes shown and described. Accordingly, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:
An anti-glare attachment for an automobile windshield, said attachment comprising: a flat-faced panel constituting and providing a headlight beam intercepting glare-reducing shield, said panel having at least one corner portion thereof provided with a hole which is designed and adapted to permit passage therethrough of a panel clamping and supporting stud, a suction cup of a size relatively smaller than the over-all size of said panel and of a diameter greater than the diameter of said stud hole, said cup having a shank integrally joined and axially related to one coacting side of said suction cup, the other end of said stud being flat, said stud being of a cross section greater than the diameter of said stud hole and having an axial screw-threaded socket alined with and communicating with said hole, a flat-faced elongated plate-like member one face of which is provided with advertising media, said plate being of a length greater than the cross section of said shank and diameter of said suction cup, but appreciably less than the length of said panel, said plate having one lengthwise edge portion opposed to a cooperating surface of said panel, a median part of said edge portion being provided with an integral abutment, said abutment having a flat face contacting the cooperating surface of the panel, said abutment being of a diameter appreciably greater than the diameter of said stud hole, said abutment being provided with a laterally projecting screw-threaded stud and said stud passing through said hole and being screwed into the aforementioned screw-threaded socket.

References Cited by the Examiner

UNITED STATES PATENTS

| 253,392 | 2/1882 | Jones et al. | 40—125 X |
| 1,158,005 | 10/1915 | Richards | 40—125 X |
| 1,228,545 | 6/1917 | Fitzgerald | 296—97 X |
| 1,532,308 | 4/1925 | Downing | 40—125 X |
| 1,610,305 | 12/1926 | Muncie | 296—97 X |
| 1,799,445 | 4/1931 | Stansberry | 20—40.5 |

EUGENE R. CAPOZIO, *Primary Examiner.*

LAWRENCE CHARLES, *Examiner.*

SHELDON M. BENDER, *Assistant Examiner.*